July 30, 1968  W. R. ERICK  3,394,683
OPPOSED PISTON ENGINE

Filed June 21, 1967  8 Sheets-Sheet 1

INVENTOR.
WILLIAM R. ERICK
BY Herbert E. Kidder
AGENT

July 30, 1968

W. R. ERICK 3,394,683

OPPOSED PISTON ENGINE

Filed June 21, 1967

INVENTOR.
WILLIAM R. ERICK
BY Herbert E. Kidder
AGENT

July 30, 1968  W. R. ERICK  3,394,683
OPPOSED PISTON ENGINE
Filed June 21, 1967  8 Sheets-Sheet 3
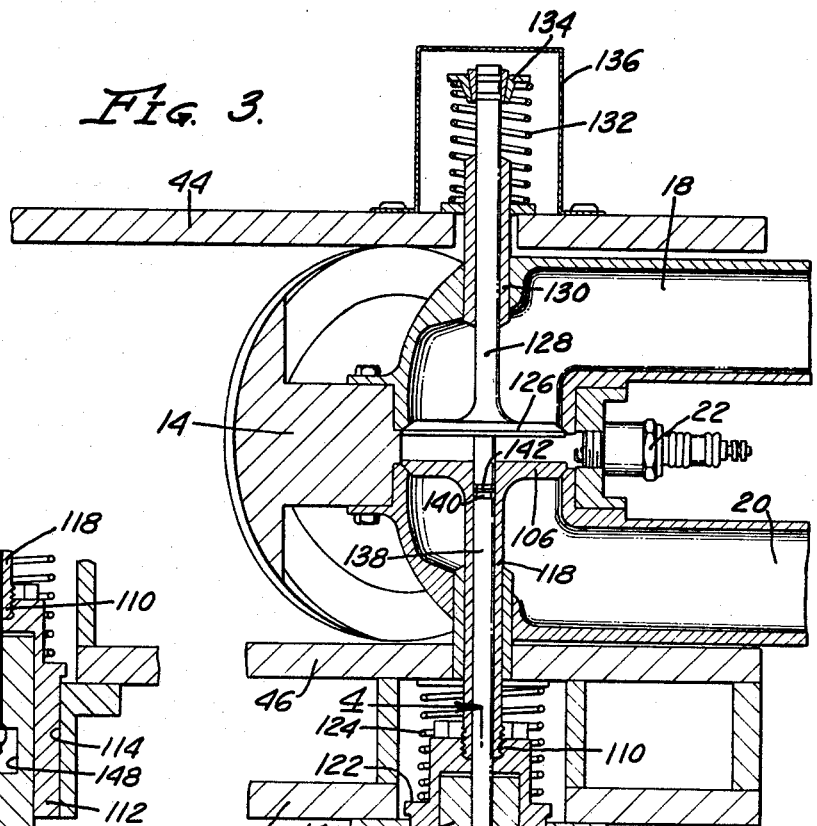
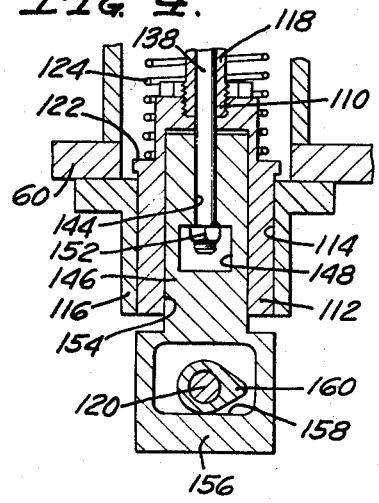
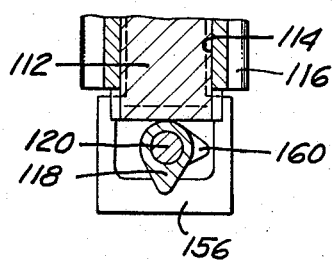
INVENTOR.
WILLIAM R. ERICK
BY Herbert E. Kidder
AGENT July 30, 1968     W. R. ERICK     3,394,683
OPPOSED PISTON ENGINE Filed June 21, 1967                                                8 Sheets-Sheet 4

INVENTOR
WILLIAM R. ERICK
BY Herbert E. Kidder
AGENT

July 30, 1968  W. R. ERICK  3,394,683
OPPOSED PISTON ENGINE
Filed June 21, 1967  8 Sheets-Sheet 8

INVENTOR
WILLIAM R. ERICK
BY Herbert E. Kidder
AGENT

United States Patent Office 3,394,683
Patented July 30, 1968

3,394,683
OPPOSED PISTON ENGINE
William R. Erick, 5238 Sierra Vista,
Riverside, Calif. 92505
Continuation-in-part of application Ser. No. 474,814,
July 26, 1965. This application June 21, 1967, Ser.
No. 653,291
14 Claims. (Cl. 123—53)

ABSTRACT OF THE DISCLOSURE

A six cylinder internal combustion engine comprising three pairs of cylinders arranged in the form of a hexagon, the two cylinders of each pair having a common cylinder head, and three crankshafts disposed between adjacent pairs of cylinders and connected to a common output driveshaft, the connecting rods on opposite sides of each crankshaft being connected to a common crank, and the intake and exhaust valves for each cylinder head being disposed opposite one another and in axial alignment, said valves being actuated by cams driven from the output driveshaft.

Cross-reference to related application

This application is a continuation-in-part of my copending application Ser. No. 474,814, filed July 26, 1965, now abandoned.

Background of the invention

The present invention relates generally to internal combustion engines, and more particularly to that class of engines known as "opposed piston" engines, wherein the cylinders are grouped in pairs, with each pair of cylinders sharing a common combustion chamber, and the pistons of each pair of cylinders moving in opposite directions relative to one another.

Summary

The primary object of the invention is to provide a new and highly efficient design of opposed-piston engine which is extremely compact in configuration; wherein the inertial forces are almost completely balanced out, making the engine smooth-running and vibrationless; and which is characterized by good breathing, high thermal efficiency, and low weight of reciprocating parts in the valve train.

Another important object of the invention is to provide a flat, "pancake" type of engine in which the driveshaft is normally vertical, making it particularly useful for vertical-drive applications, such as well pumps, helicopter rotor drives, and the like. A flat, pancake engine of this type can also be used to good advantage in certain classes of automobiles, buses, trucks, boats, and the like, where the engine of very low profile is required. In the case of electric power generating plants, it would be feasible to mount the generator with its armature turning about a vertical axis, and the engine mounted directly on top of it, thereby minimizing the floor area taken up by the unit.

A further object of the invention is to provide an engine design that lends itself readily to "stacking" two or more units for the purpose of multiplying power output, using the same size cylinders, pistons, and other associated parts. Thus, while the basic engine has six cylinders, two or more of the units can be joined together to make a twelve-cylinder engine, or to provide any desired multiple of six cylinders. One important advantage of this feature is that it minimizes the inventory of parts required to assemble or service engines of widely different power outputs.

Another object of the invention is to provide a six-cylinder, air-cooled engine, having a perfectly uniform distribution of cooling air to all of the cylinders and heads, thereby providing a uniformity of cooling that is virtually impossible to achieve in other engine designs.

A further object of the invention is to provide an engine design of balanced geometric configuration, utilizing a minimum number of certain basic parts, with many of the components serving two cylinders instead of only one, as in the case of conventional engines. Thus, my improved six-cylinder engine uses only half the number of spark plugs, valves, pushrods, and related parts required in a conventional engine. Moreover, since the crankshafts, cylinders, cylinder heads, camshafts, and many other parts are identical, only a minimum number of separate items are required, and this reduces the cost of tooling and patterns, as well as minimizing the number of different machine set-ups necessary to produce the engine.

Another object of the invention is to provide an engine of the class described having a driveshaft that is geared to turn at a slower speed than the crankshafts, and that can be given any desired crankshaft-to-output-shaft ratio (within certain limits) at little or no additional cost.

Another object of the invention, in one of its aspects, is to provide a new and improved six-cylinder engine of hexagonal configuration, wherein pairs of opposed cylinders share common combustion chambers, each having an intake and exhaust valve actuated by a novel desmodromic valve mechanism whereby the valves are both opened and closed by the cam.

Still a further object of the invention in another of its aspects is to provide a six-cylinder, 2-cycle engine of hexagonal configuration, wherein pairs of opposed cylinders share common combustion chambers, each of which has an intake valve actuated by a central cam.

These and other objects and advantages of the present invention will become apparent to those skilled in the art upon consideration of the following detailed description of three illustrative embodiments thereof.

Description of the drawings

FIGURE 3 is a further enlarged fragmentary sectional view through one of the cylinder heads, showing a modified form of the valve mechanism;

FIGURE 4 is a fragmentary sectional view taken at 4—4 in FIGURE 3;

FIGURE 5 is a fragmentary sectional view taken at 5—5 in FIGURE 3;

Figure 1:
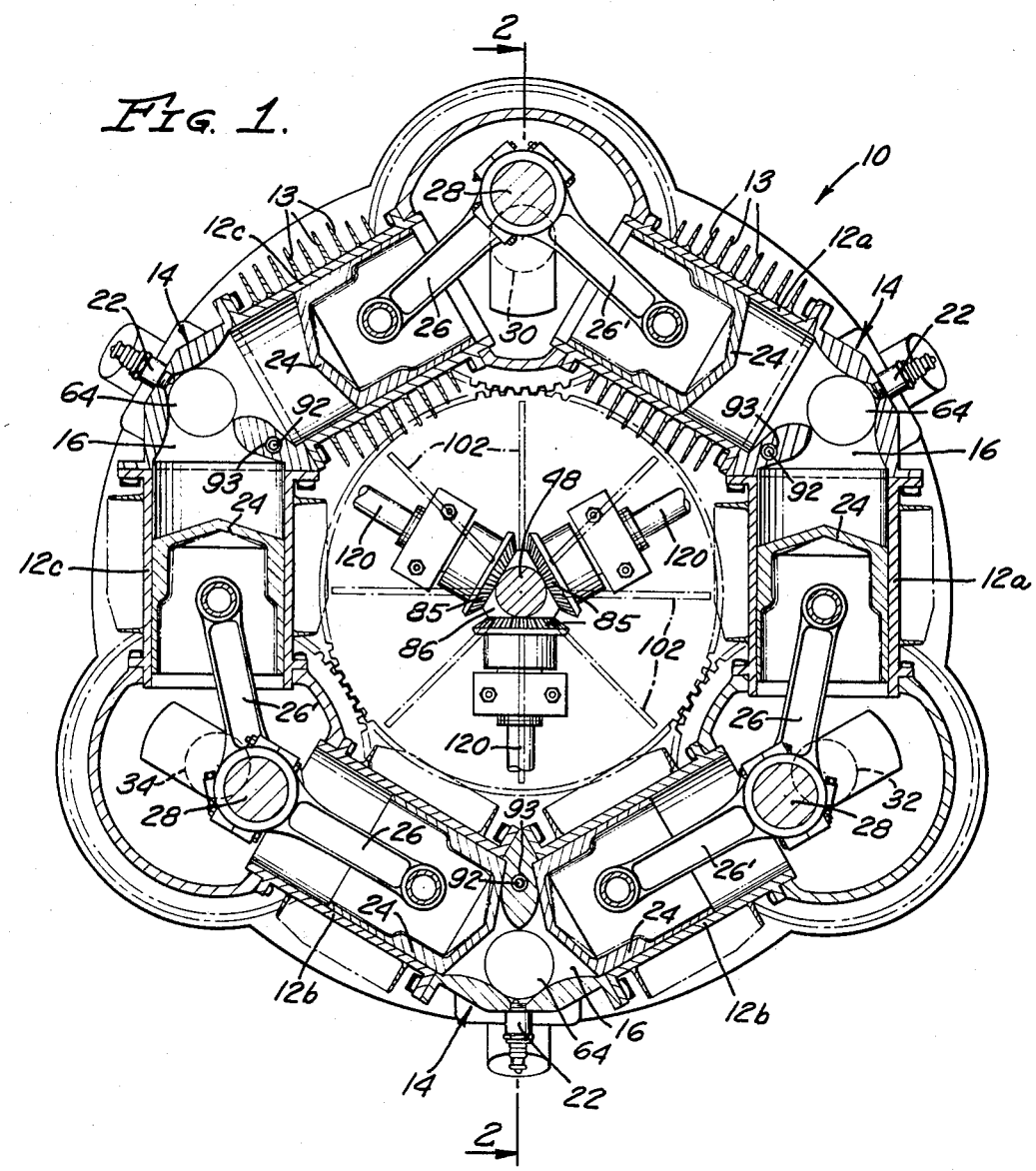
FIGURE 1 is a horizontal sectional view through an engine embodying the principles of the invention, taken essentially along the line 1—1 of FIGURE 2, but with portions of the engine cut away to reveal certain structural details below the section line.
Figure 2:
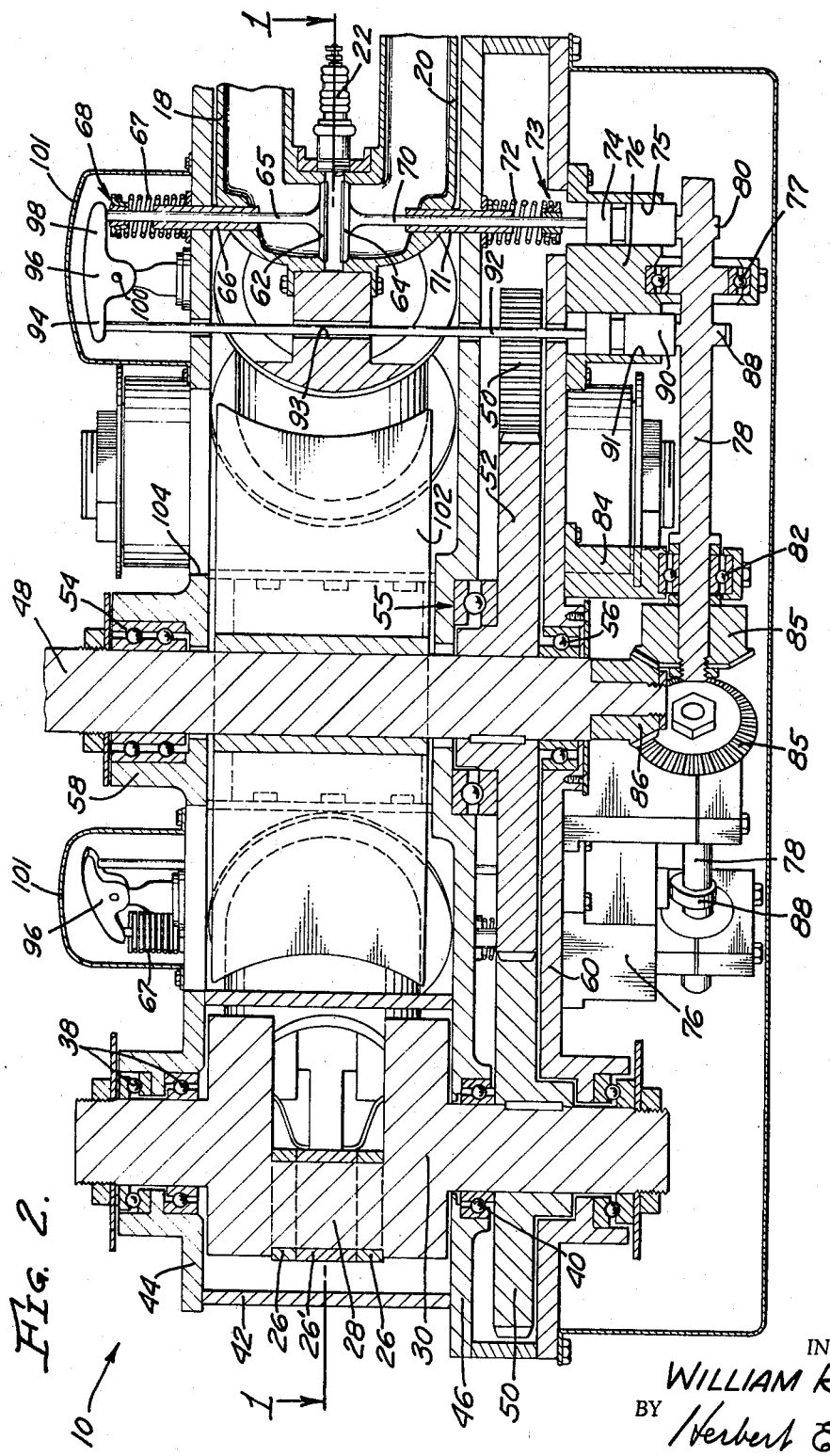
FIGURE 2 is an enlarged transverse sectional view of the same, taken at 2—2 in FIGURE 1.

The first embodiment of the invention to be described is shown in FIGS. 1 and 2, to which attention is now directed. The engine is designated in its entirety by the reference numeral 10, and comprises six air-cooled cylinders 12, arranged in the form of a hexagon; each of the said cylinders having radially projecting cooling fins 13. The six cylinders are grouped in three pairs designated 12a, 12b, and 12c, respectively. The two cylinders in each of said pairs are joined to a common wedge-shaped cylinder head 14, and share a common combustion chamber 16. Each of the cylinder heads 14 has an intake manifold 18 and an exhaust manifold 20 connected thereto, and screwed into the outer end of the cylinder head between these manifolds is a spark plug 22.

The two cylinders of each pair are disposed at an angle of 120 degrees to one another, and the adjacent cylinders of any two pairs are likewise disposed at an angle of 120 degrees to one another, making a perfect hexagon. The cylinders are all disposed within a single horizontal plane, and slidably disposed within each cylinder is a piston 24, having a connecting rod 26 or 26'. The big ends of the connecting rods 26, 26' are connected to a common crank 28 on one of the three crankshafts 30, 32, and 34, which are parallel to one another, and each of which is disposed centrally between the two adjacent cylinders of the two pairs. The two pistons connected to each crankshaft are 120 degrees out of phase with respect to one another, and since the two cylinders of each pair share the same combustion chamber, they both have their power strokes at the same time. As there are three power impulses for each two revolutions of the crankshaft, the power impulses of the two pistons connected to each crankshaft are thus 240 degrees apart.

Each of the crankshafts 30, 32, 34, is mounted for rotation about a vertical axis, and is supported by upper and lower bearings 38 and 40. Each of the crankshafts is enclosed within a crankcase 42, the top end of which is closed by an upper horizontal plate 44, and the bottom end of which is closed by a base plate 46. The bearings 38 and 40 are mounted within suitable bearing seats in the cavities 44 and 46, respectively.

The three crankshafts 30, 32 and 34 are drivingly connected to a central output shaft 48, which extends up through the center of the hexagon, perpendicular to the plane of the cylinders. This is accomplished by means of gears 50 mounted on the lower ends of the crankshafts, which mesh with a larger diameter gear 52 fixed to the lower end of the output shaft 48. Output shaft 48 is rotatably supported by three sets of bearings 54, 55 and 56, and its top end is adapted to be connected to the load which the engine is to drive. Bearing 54 may be a two-row ball bearing, as shown in FIG. 2, and is mounted within a hub 58, which is formed as part of the upper plate 44. Bearing 55 is seated within a circular cavity formed in the underside of base plate 46, and the lowermost bearing 56 is mounted on a bottom plate 60, that encloses gears 50 and 52 from below.

Each of the cylinder heads 14 has an intake valve 62 and an exhaust valve 64 seated in opposite sides thereof, said valves having their heads directly across from one another, with their stems extending in opposite directions. The stem 65 of intake valve 62 is slidably disposed within a tubular guide valve 66, which is pressed into a bore in the top side of the cylinder head. A valve spring 67 encircles the stem 65 and bears at its top end against a washer 68, that is held to the stem by a suitable retainer.

Stem 70 of the exhaust valve 64 is slidably disposed within a valve guide 71, and is urged against its seat by a valve spring 72, which bears against a washer 73, that is secured to the stem by a suitable retainer. The bottom end of stem 70 is engaged by a tappet 74, which slides within a bore 75 in the housing 76. Housing 76 is bolted to the underside of bottom plate 60, and also provides support for a bearing 77, which supports the outer end of a cam shaft 78. Formed integrally with the cam shaft 78 on the outside of bearing 77 is an outer cam lobe 80, which acts against the bottom end of tappet 74.

Cam shaft 78 extends radially from the center of the hexagon, and there is one cam shaft for each pair of cylinders. Thus, there are three cam shafts, which are spaced apart 120 degrees from one another, as best shown in FIG. 1. Near their inner ends, the cam shafts 78 are supported by bearings 82 mounted on supporting blocks 84, each of which is bolted to the underside of bottom plate 60.

Fixed to the inner end of each of the cam shafts 78 is a bevel gear 85, that meshes with a companionate bevel gear 86 on the bottom end of output shaft 48. The gear ratios of bevel gears 85, 86 are such that the cam shafts 78 are driven at half the crankshaft speed, in the usual manner.

Formed integrally with the cam shaft 78 on the inside of bearing 77 is a second cam lobe 88, which engages the bottom end of a tappet 90 that slides within a bore 91 in the housing 76. The top end of tappet 90 bears against the bottom end of a pushrod 92, and the latter extends upwardly through aligned openings in plates 44, 46, 60 and through a bore 93 in the cylinder head. The top end of pushrod 92 acts against one arm 94 of a rocker 96, the other arm 98 of which bears against the top end of intake valve stem 64. The rocker 96 is pivotally supported for rocking movement about a pivot point 100, and the rocker assembly is suitably enclosed within a rocker arm cover 101.

As mentioned earlier, the cylinders 12 are air-cooled, and cooling air for the fins 13 is provided by a centrifugal blower impeller 102, which is fixedly mounted on the output shaft 48 in the space between the cylinders. Air is admitted to the blower impeller 102 through inlet openings 104 in upper plate 44.

A modified form of the valve gear mechanism is shown in FIGS. 3, 4 and 5, to which attention is now directed. In this form of the invention, the exhaust valve 106 has a hollow, tubular stem 108, and its lower end is threaded at 110 into a tappet 112. Tappet 112 slides within a cylindrical bore 114 in member 116, which is bolted to the underside of plate 60, and the bottom end of the tappet projects below the bottom surface of the member 116. Two axially spaced, identical cam lobes 118 are provided on a cam shaft 120, and these lobes 118 bear against the bottom end of tappet 112 at opposite sides thereof. Near its upper end, tappet 112 is provided with an annular shoulder 122, and standing on this shoulder is a valve spring 124, the top end of which bears against the underside of plate 46. Spring 124 bears downwardly against tappet 112, thereby holding the exhaust valve 106 down against its seat, except when it is being lifted by the cam lobes 118.

The intake valve 126 has the usual guide stem 128, which is slidably disposed within a tubular valve guide 130, and at the upper end of the valve stem is a spring 132 which bears upwardly against a washer 134. Washer 134 is secured to the stem 128 by the usual retainer, and the spring 132 thus bears against the stem 128 to hold intake valve 126 against its seat. A bonnet 136 encloses valve spring 132 and the outer end of the valve stem.

Fixed to the top side of the intake valve head 126 and projecting in the direction opposite from the stem 128 and coaxial therewith, is an actuating stem 138. Actuating stem 138 passes through the center of the tubular stem 118 of the exhaust valve 126, and is provided with an annular groove 140, in which there is a suitable sealing means 142 to prevent leakage of combustion gases. At its bottom end, the actuating stem 138 passes down through a bore 144 in a tappet 146, and emerges into a cavity 148 formed in the tappet. The projecting end of the stem 138 is threaded at 150 to receive a nut 152, and tappet 146 engages the nut 152 to pull stem 138 downward. Tappet 146 is slidable within a bore 154 in tappet 112, and projecting downwardly from the bottom end of tappet 146 is a tongue 156 having an opening 158 formed therein, through which cam shaft 120 passes. A cam lobe 160 is provided on cam shaft 120 in the space within the opening 158, and this cam lobe is adapted to bear downwardly against the bottom edge of opening 158, thereby pulling tappet 146 downwardly. The opening 158 is large enough in width and depth to clear the cam lobe 160, except where the lobe bears against its bottom edge.

The operation of this form of the invention is believed to be fairly clear from the foregoing description. The exhaust valve 106 is lifted from its seat in the usual manner by the two cam lobes 118, which bear upwardly against the bottom of tappet 112, to raise the exhaust valve against the pressure of spring 124. Intake valve 126, on the other hand, is pulled downwardly off its seat by the action of cam lobe 160 acting downwardly against tappet 146. The downward pull of tappet 146 is transmitted to the intake valve 126 by actuating arm 138, and the only function of guide stem 128 is to guide the intake valve onto its seat, and to provide means for applying the pressure of valve spring 132 against the valve in the direction to pull it tightly against its seat. The advantage of this arrangement is that it allows the cam shaft 120 on one side of the cylinder head to open the valve in the opposite side of the cylinder head, without external pushrods and rocker arms.

Figure 6:
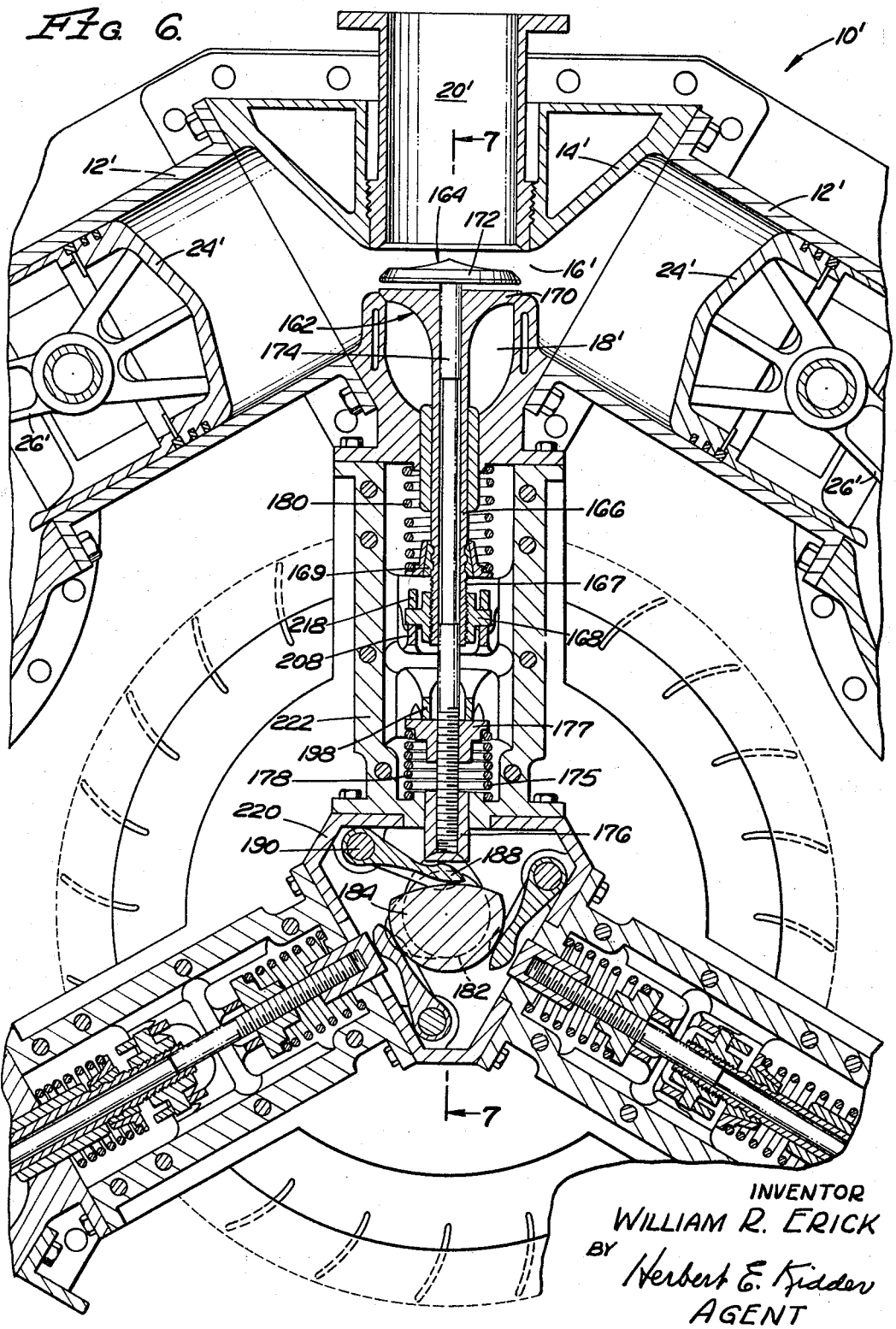
FIGURE 6 is an enlarged fragmentary sectional view through another embodiment of the invention, showing another form of cam means and desmodromic valve mechanism for lifting and closing the valves.
Figure 7:
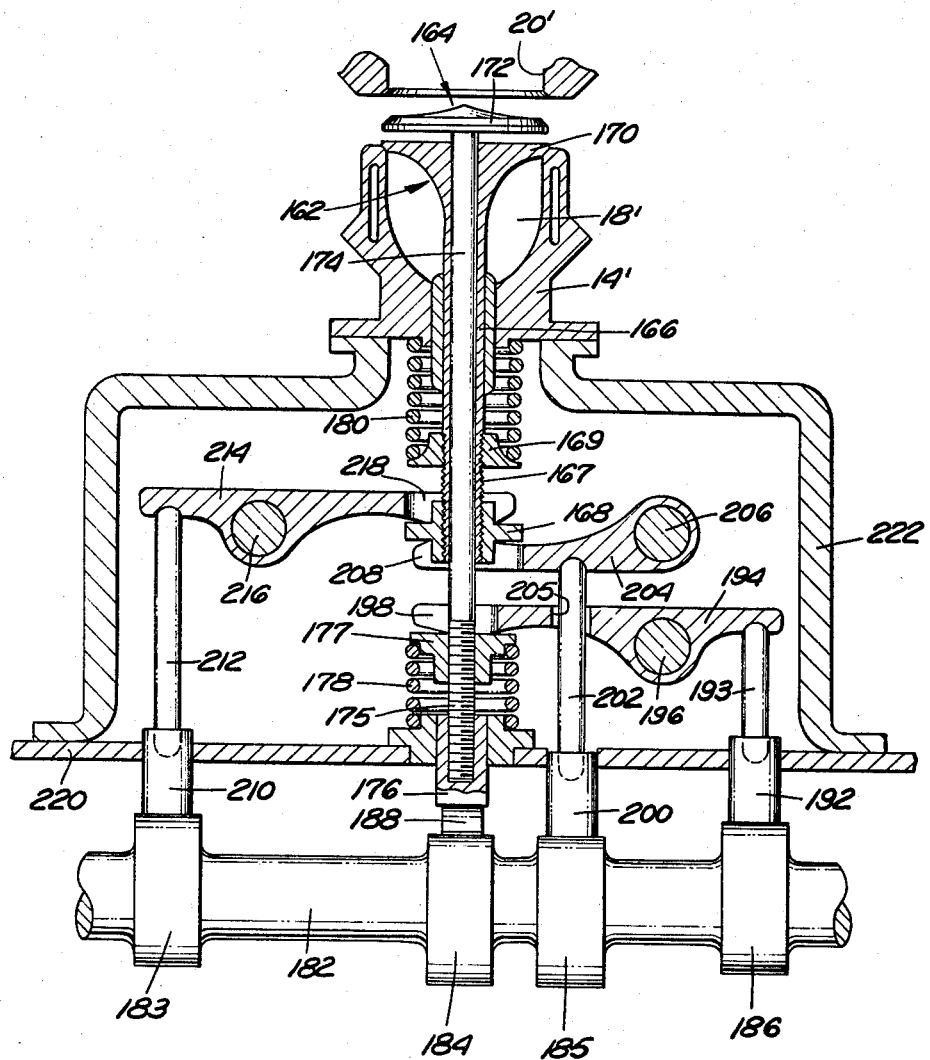
FIGURE 7 is a fragmentary sectional view through the same, taken at 7—7 in FIGURE 6.

Another modification of the invention is shown in FIGS. 6 and 7. In this embodiment, elements which are substantially identical to those described earlier in connection with the embodiments of FIGS. 1–5 are given the same reference numeral, to which the prime (′) suffix has been added. As in the preceding embodiments, the six cylinders 12′ of this engine are arranged in the form of a hexagon and are grouped in three pairs; the two cylinders of each pair being disposed at an angle of 120 degrees to one another and being joined to a common cylinder head 14′, so that they share a common combustion chamber 16′. Each of the cylinder heads has an intake port 18′ and an exhaust port 20′, which are controlled by intake valves 162 and exhaust valves 164, respectively. The intake valve 162 has a hollow, tubular stem 166, and its lower end is threaded at 167 to receive both a collar 168 and a spring keeper 169. The head of the intake valve is designated 170, and the exhaust valve head is 172.

Fixed to what is normally the top side of the exhaust valve head 172 and projecting perpendicularly thereto is a stem 174. Stem 174 passes through the center of the tubular stem 166 of the intake valve 162, and is slidable therein. Stem 174 projects beyond the end of the tubular stem 166 and is threaded at 175 to receive both a tappet 176 and spring keeper 177. Keeper 177 is engaged by one end of a spring 178, which urges the exhaust valve 164 upwardly (i.e., radially outward) against its seat; while keeper 169 is engaged by one end of a spring 180, which urges the intake valve 162 downwardly (i.e., radially inward) against its seat. The two valve heads 170 and 172 are directly across from one another in the cylinder head 14′, and both valve stems 166 and 174, extend radially inward toward the center of the hexagon defined by the cylinders 12′.

The cam shaft 182 of this embodiment is located at the center of the hexagon, and its axis is perpendicular to the plane thereof. The cam and valve gear shown herein is what is known as a "desmodromic" valve gear, wherein the cam acts both to open and close each of the valves, and the springs 178 and 180 serves merely to hold the valve heads tightly against their respective seats in case there is any clearance in the mechanism which might tend to allow leakage of high pressure gases. The desmodromic valve gear eliminates "spring float" and enables the engine to run at a higher r.p.m. It also makes it possible to use a cam contour that gives good torque throughout the whole operating range of the engine, instead of only at the high speed or low speed end thereof, as the case may be. For maximum torque at low engine r.p.m. there should be a relatively small amount of valve overlap (the number of crankshaft degrees that both intake and exhaust valves are open at the same time), and the valves would open and close very rapidly. However, at high engine r.p.m. it is impossible for the springs to close the valves as fast as the cams would permit, and the resulting lag between the cam followers and the cam is known as "valve float." The detrimental effect of valve float can be minimized by careful design of cams, using lots of overlap, and employing differentially wound, damped springs. Thus, equipped, engines have been run at speeds of more than 12,000 r.p.m., but such engines run poorly at low r.p.m. due to the large amount of valve overlap. With the desmodromic valve, which is opened and closed by the cam, there is no problem of getting the valve to close rapidly enough at high speed, and the engine therefore enjoys the benefit of high torque at all speeds.

As best shown in FIG. 7, the cam shaft 182 has four axially spaced lobes 183, 184, 185 and 186 provided thereon. Lobe 184 closes the exhaust valve 164; lobe 186 opens the exhaust valve; lobe 185 opens the intake valve 162; and lobe 183 closes the intake valve. Those cam lobes that lift the valves from their seats are referred to in the claims as "lifter" lobes, and those that close the valves against their seats are referred to as "closer" lobes.

Closer lobe 184 acts against the bottom end of the tappet 176 through a cam follower 188. Cam follower 188 is essentially a lever arm, one end of which is pivoted at 190 on the engine housing, and the other end of which rides on cam lobe 184. The purpose of follower 188 is to take the lateral, or wiping force of the cam lobe, so that the tappet 176 is subjected only to lifting force.

Opener lobe 186 acts against a tappet 192 which, in turn, acts through a pushrod 193 against one end of a rocker 194. Rocker 194 is pivoted intermediate its ends on a shaft 196, and its other end is bifurcated at 198 to pass on opposite sides of the valve stem 174 and bear downwardly against the shoulder means defined by the top surface of spring keeper 177. Thus when tappet 192 is lifted by cam lobe 186, rocker 194 is oscillated in the counter-clockwise direction, causing the stem to be pulled downwardly, thereby lifting valve head 172 from its seat.

Opener lobe 185 acts upwardly against a tappet 200 which, in turn, acts through a pushrod 202 against a rocker arm 204. Pushrod 202 passes through a clearance hole 205 in rocker 194. Rocker arm 204 is pivoted at one end on a shart 206, and its other end is bifurcated at 208 to pass on either side of stem 166 and bear upwardly against the underside of a radial flange on collar 168, forming a shoulder means on the tubular stem 166.

Closer lobe 183 acts upwardly against a tappet 210 which, in turn, acts through a pushrod 212 against one end of rocker 214. Rocker 214 is pivoted intermediate its ends on a shaft 216, and its other end is bifurcated at 218 to pass on opposite sides of the valve stem 166 and bear downwardly against the shoulder means defined by the top surface of the radial flange on collar 168.

Each of the pushrods 193, 202 and 212 has spherically rounded ends which are seated within spherically concave sockets in the associated tappets or rockers, thereby permitting a limited amount of free angular movement between them caused by the arcuate paths of the said sockets as the rockers oscillate. The bifurcated ends of the rockers are also rounded on the sides that contact their respective shoulder means, as shown in FIG. 7.

One of the advantages of the rocker valve gear shown herein is that it allows for multiplication of the cam lift, owing to the difference in moment arm between the point of contact of the rocker by the pushrod and the point of contact between the pushrod and the shoulder means on the valve stem. Thus, each of the three cam lobes 183, 185 and 186 has its lift approximately doubled by the 2:1 differential in moment arm length of the respective rockers.

The cam shaft 182, followers 188, 190 and tappets 176, 192, 200 and 210 are enclosed within a generally prismatic-shaped housing 220 at the center of the hexagon defined by the cylinders. The valve gear, consisting of valve stems 166, 174; springs 178, 180; push rods 193, 202, 212; rockers 194, 204, 214; and related parts, are contained within housings 222 which are attached at one end to the cam housing 220 and extend radially therefrom, the other end being attached to the inner side of the associated cylinder 14'.

There are several advantages in this embodiment over the embodiment shown in FIGS. 6 and 7. For one thing, there is only one cam shaft with four lobes provided thereon, which actuate the valves of all three cylinder heads. The central cam shaft 18 may be driven from the three crankshafts by gears, in the same manner that the drive shaft 48 is driven in FIGS. 1 and 2, or it may be driven by a chain drive, as will be described presently, in connection with the embodiment of FIGS. 8, 9 and 10. Another advantageous feature of this embodiment is, of course, the positive opening and closing of the valves by the desmodromic valve gear, which enables the engine to operate at high r.p.m., and which also makes it possible to use fast-opening and closing cam lobe profiles, which eliminate excessive overlap and make for high torque at low r.p.m.

Figure 8:
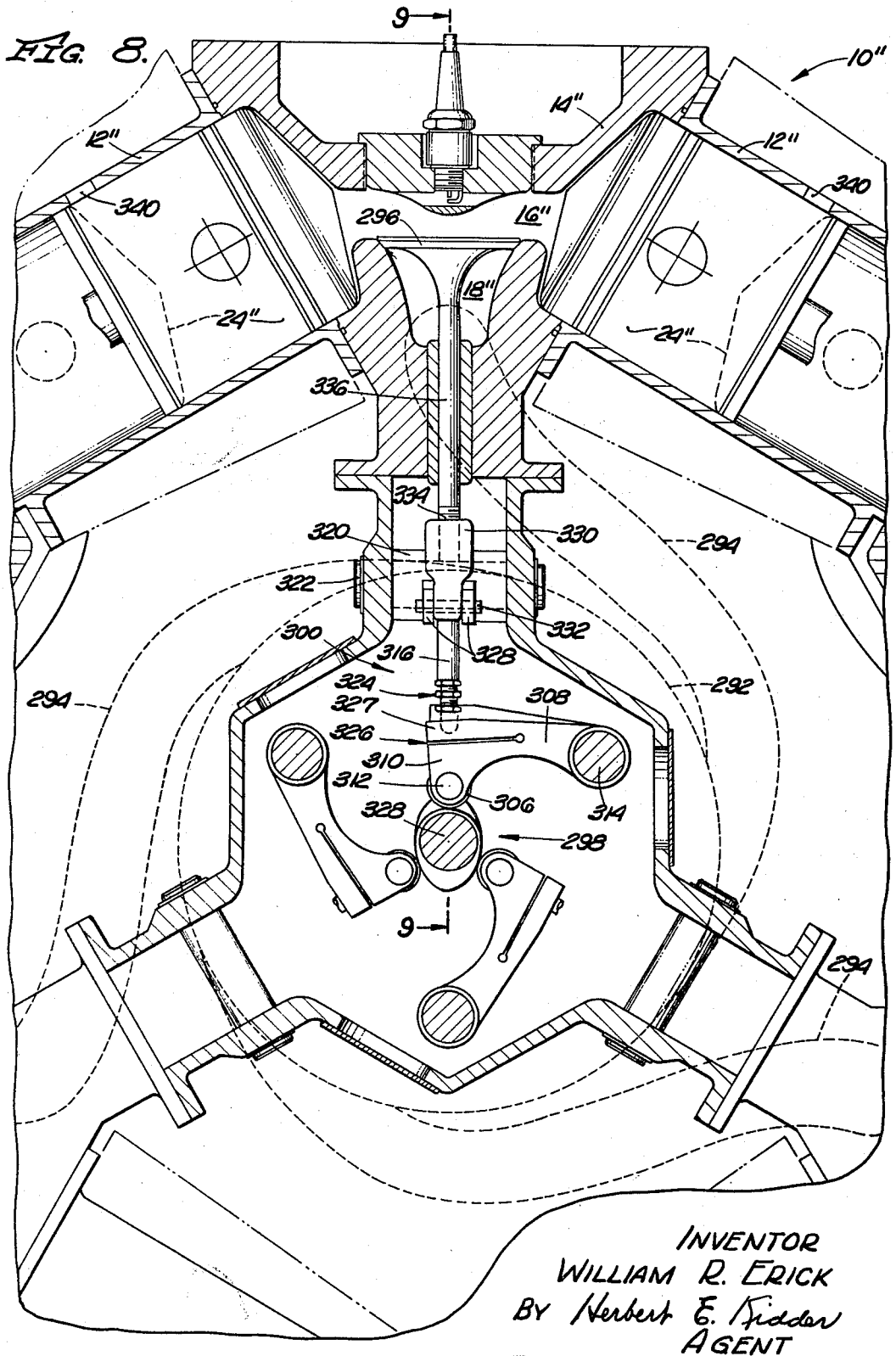
FIGURE 8 is an enlarged fragmentary sectional view, similar to FIGURE 6, of still another embodiment of the invention, showing yet another form of cam means and desmodromic valve mechanism for lifting and closing the intake valve of a 2-cycle engine.
Figure 9:
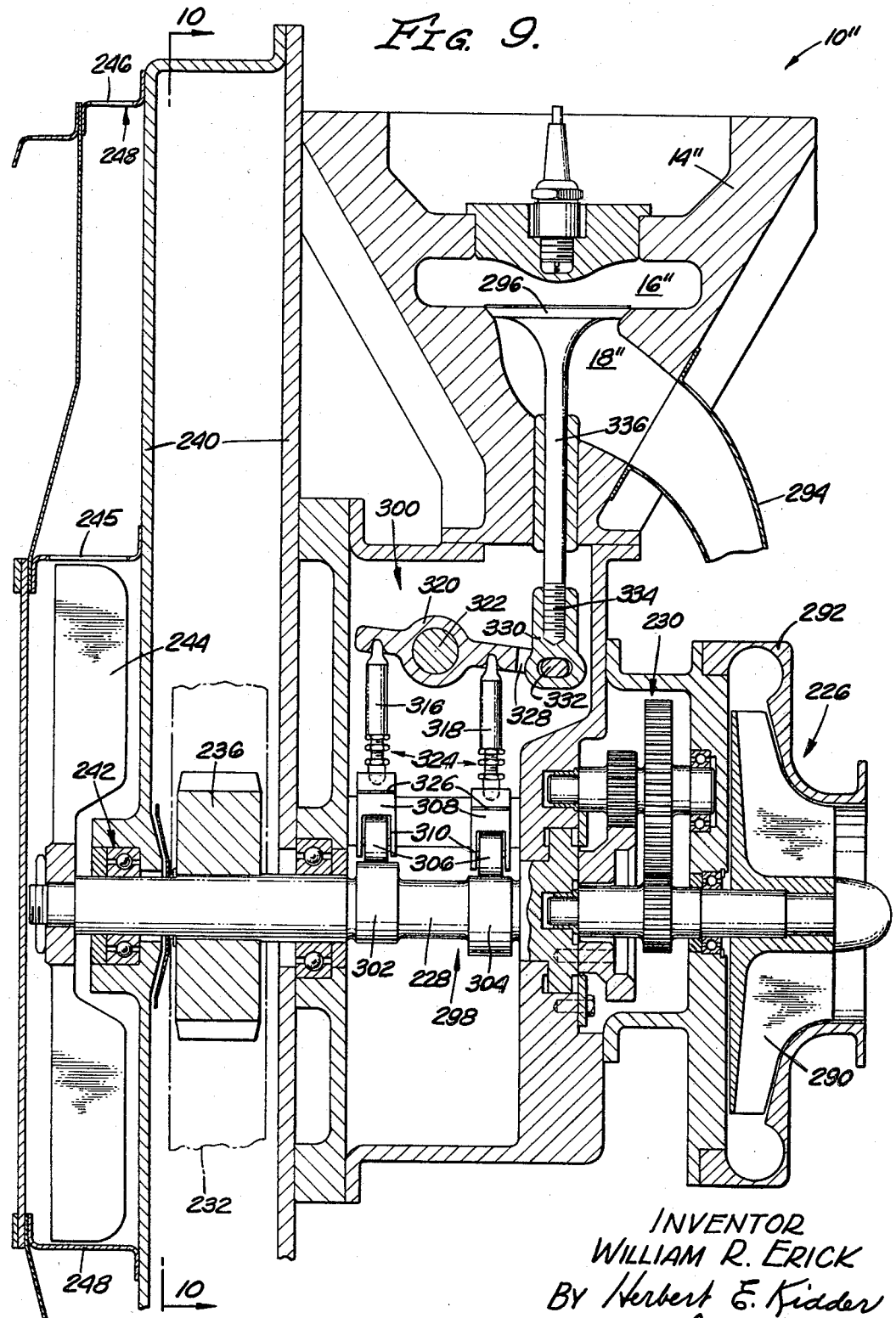
FIGURE 9 is a sectional view, taken at 9—9 in FIGURE 8.
Figure 10:
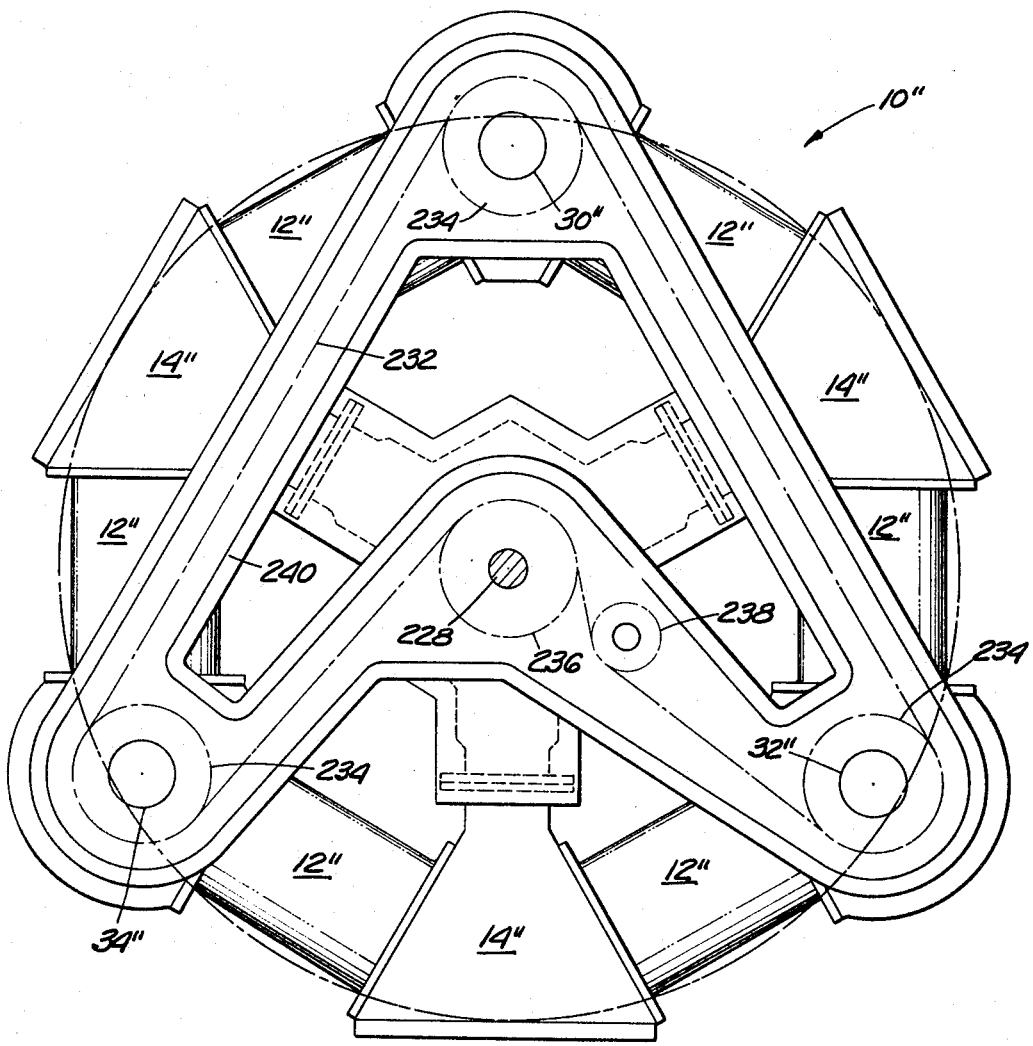
FIGURE 10 is a somewhat schematic view (drawn to reduced scale) of the back side of the engine, as seen at 10—10 in FIGURE 9, showing the chain drive connecting the crankshafts and driving the camshaft.

FIGS. 8, 9 and 10 show still another form of my invention, using the 2-cycle principle. Parts similar to those described in the earlier embodiments are given the same reference numerals, to which the double-prime ('') suffix has been added. Here again, the six cylinders 12'' are arranged in the form of a hexagon, with pairs of cylinders sharing the same common cylinder head 14'', and the pistons of adjoining pairs of cylinders connected to a common crank of a crankshaft disposed between the cylinder ends.

The 2-cycle engine 10'' of FIGS. 8, 9 and 10 is of the super-charged type having intake valves 224 in the cylinder heads 14'', and a centrifugal supercharger 226, which is driven from the camshaft 228 through speed-increase gears 230. As in the embodiment of FIGS. 6 and 7, the camshaft 228 is located at the center of the hexagon, with its axis perpendicular to the plane thereof. The three crankshafts 30'', 32'' and 34'' are connected together by a double-flexure, silent chain 232 (see FIG. 10) which also drives the camshaft 228. Chain 232 passes around sprockets 234 on the crankshaft, and also passes, in a reverse curve, around a sprocket 236 on camshaft 228, so as to drive the camshaft in the opposite direction to the crankshafts. An idler sprocket 238 is provided to take up slack in the chain, and suitable provision may be made for adjusting the position of the idler sprocket to maintain the proper tension in the chain. The chain 232 and sprockets 234, 236, 238, are enclosed within a housing 240 on the bottom side of the engine, which is at the left-hand side in FIG. 9.

The left-hand end of the camshaft 228 (as viewed in FIG. 9) passes through a sealed bearing 242 in the housing 240, and mounted on the projecting outer end thereof is a fan, or blower 244, which draws air over the cooling fins of the cylinders, through the spaces surrounding the different sections of the chain housing 240 (as will be noted in FIG. 10) and discharges it through openings 245 and 246 in perforated grilles 247 and 248, respectively, surrounding the fan.

Air thrown outwardly by the supercharger impeller 290 is channeled through a volute housing 292 and pipes 294 to intake ports 18'' leading into the combustion chambers 16'' of the cylinder heads 14''. The flow of air from the port 18'' into the combustion chamber 16'' is controlled by a valve 296, which is actuated by cam means 298 and a desmodromic valve gear mechanism 300, which will now be described.

The cam means 298 comprises two axially spaced cam lobes 302 and 304, which are engaged by rollers 306 of cam-followers 308. Each of the rollers 306 is disposed between the side-pieces of the bifurcated end 310 of its cam-follower, and is journaled on a pin 312. Each of said cam-followers 308 is essentially a lever arm which is pivoted at one end on a pivot shaft 314. The bifurcated end 310 and roller 306 are located at the other end of the lever arm, and seated in sockets in the top side of said other end of the lever arms directly above the rollers 306 are pushrods 316 and 318. The pushrods 316 and 318 extend upwardly from their respective cam followers 308, and their top ends engage a rocker 320 on opposite sides of its pivot. The rocker 320 extends generally parallel to the cam shaft 228, and is pivoted intermediate its ends on a pivot shaft 322. As shown in FIG. 9, the upper ends of the pushrods are spherically rounded and are seated in spherical sockets in the underside of the rocker 320; pushrod 316 engaging the rocker on the left-hand side (as viewed in FIG. 9) of the pivot shaft 320, while pushrod 318 is on the right-hand side thereof. Each of the pushrods 316, 318 has adjustment means 324 provided thereon, whereby said pushrods can be adjusted in length to provide the exact operating clearance required for correct operation.

It will be noted that each of the cam followers 308 has a narrow slit 326 extending substantially radially inward from the free end of the follower toward the pivot shaft 314. Slit 326 is preferably about .020'' wide, and extends all the way through the follower 308 from one side thereof to the other. The purpose of this slit 326 is to provide means for accommodating a limited amount of expansion or contraction in the distance between the associated pushrod and its respective cam lobe. This distance will vary as the valve stem becomes hot and expands in length. That portion 327 of the cam follower above the slit 326 functions as a cantilever beam, and by virtue of the elasticity of the steel of which it is made, bends down under excessive load until it closes the gap of the slit 326. Thus the ability of the cantilever beam 327 to bend down for a distance of approximately .020'' (more or less), permits the cam follower 308 to accommodate itself to any expansion of the parts.

The right-hand end of the rocker 320 (as viewed in FIG. 9) extends beyond the right-hand pushrod 318 and is bifurcated at 328 to pass on opposite sides of a fitting 330, to which it is secured by a pin 332. The fitting 330 is screwed onto the threaded lower end 334 of the valve stem 336. Thus, when the rocker 320 is oscillated in the counter-clockwise direction from the position shown in FIG. 9, the valve 296 is lifted from its seat; and when the rocker returns in the clockwise direction, the valve is closed on its seat. Here again, the desmodromic valve gear gives positive opening and closing of the valve, with its attendant advantages. The difference in moment arm between the center of the shaft 322 and the pushrods 316, 318, relative to the moment arm from the center of the shaft to the point of lifting contact on the fitting 330 gives an approximately 2:1 multiplication of cam lift, which is advantageous.

In this form of the invention, the exhaust gases are exhausted through ports 340 in the sides of the cylinder walls 12'', which are uncovered as the pistons 24'' reach the bottom of their stroke.

While I have shown several illustrative embodiments of the invention and described them in considerable detail, it is to be understood that the invention is not limited to such details, except as specifically recited in the claims.

I claim:

1. A six-cylinder internal combustion engine comprising:

three pairs of cylinders arranged in the form of a hexagon, each of said cylinders having a piston and connecting rod associated therewith;

the two cylinders of each of said pairs being disposed at an angle of 120 degrees to one another and being joined to a common cylinder head, whereby both cylinders have a common combustion chamber;

three crankshafts disposed between the ends of adjacent pairs of cylinders, the cylinders on opposite sides of each of said crankshafts being disposed at an angle of 120 degrees to one another;

the connecting rods of the pistons in each of the cylinders on opposite sides of each of said crankshafts being connected to a common crank on each of the said crankshafts, whereby each of said crankshafts is driven by one piston each of two adjoining pairs of cylinders, the two pistons connected to each of said crankshafts being 120 degrees out of phase with respect to one another;

means connecting each of said crankshafts to a common drive shaft, whereby both pistons in each pair of cylinders move in opposite directions with respect to one another, and both reach top-dead-center at the same instant;

means for admitting fuel and air mixture into said combustion chamber, and for exhausting the combustion products therefrom at the appropriate times;

the pistons in each of said pairs of cylinders exerting simultaneous power impulses against their respective crankshafts; and the power impulses from said first pair of cylinders being followed by power impulses from said second and third pairs of cylinders at uniformly spaced intervals of time, each interval being equal to one-third of the complete engine cycle.

2. A six-cylinder internal combustion engine, as in claim 1, wherein the axis of said drive shaft extends through the center of the hexagon defined by said cylinders and perpendicular thereto;

intermeshing gears on said crankshafts and on said drive shaft, whereby the three crankshafts are connected together to rotate in synchronism with respect to one another, and whereby both pistons in each pair of cylinders are caused to move in opposite directions relative to one another, and to reach top-dead-center at the same instant;

said cylinder heads having valves provided therein; and cam means driven by said drive shaft for actuating said valves.

3. A six-cylinder internal combustion engine, as in claim 2, wherein said cylinder heads have intake and exhaust valves provided therein, both of which are actuated by said cam means.

4. A six-cylinder internal combustion engine, as in claim 3, wherein said cylinder heads are generally wedge-shaped, with said intake and exhaust valves seating in opposite sides thereof;

said valves having their heads directly across from one another and their stems extending in opposite directions.

5. A six-cylinder internal combustion engine, as in claim 3, wherein said intake and exhaust valves are seated in opposite sides thereof, said valves having their heads directly across from one another and their stems extending in opposite directions;

three cam shafts extending radially from said drive shaft at 120 degrees with respect to one another, each of said cam shafts being connected at its inner end to said drive shaft to be driven thereby, the outer end of each of said cam shafts being disposed alongside the cylinder head of one of said pairs of cylinders;

each of said cam shafts having a pair of cam lobes adjacent the outer end thereof, one of said cam lobes being disposed directly in line with the stem of one of said valves and acting against the same;

each of said cylinder heads having a rocker pivoted on the side thereof opposite said cam shaft, said rocker having one arm acting against the stem of the other of said valves; and a pushrod acting at one end against the other arm of said rocker, said pushrod extending through from one side to the other of said engine, and the other end of said pushrod being acted upon by the other of said cam lobes.

6. An internal combustion engine as in claim 2, wherein said cylinder heads have intake and exhaust valves seated on opposite sides thereof, said valves having their heads directly across from one another and their stems extending in opposite directions;

one of said valves having a hollow tubular stem extending from the bottom side of the valve head;

the other of said valves having a guide stem extending from the bottom side of its head, and an actuating stem extending from the top side of its head coaxial with said guide stem, said actuating stem extending through said hollow tubular stem in said one valve;

said cam means comprising three cam shafts extending radially from said drive shaft at 120 degree angles with respect to one another, each of said cam shafts having a pair of cam lobes adjacent the outer end thereof;

one of said cam lobes acting against said hollow tubular stem to push said one valve up off its seat, and the other of said cam lobes acting against said actuating stem of said other valve to pull the latter off its seat.

7. A six-cylinder engine as specified in claim 2, wherein said intake and exhaust valves are disposed on opposite sides of said cylinder heads in axial alignment with respect to one another, one of said valves having a hollow tubular stem, and the other valve having its stem passing through said hollow tubular stem and slidable therein.

8. A six-cylinder internal combustion engine as in claim 2, wherein said cylinder heads have intake and exhaust valves seated on opposite sides thereof, with their heads directly across from one another and their stems coaxial;

one of said valves having a hollow tubular stem extending from the bottom side of the valve head;

the other of said valves having its stem extending from the top side of its head through said hollow tubular stem of said one valve;

said cam means including a first cam lobe acting against said hollow tubular stem to push said one valve up off its seat, and a second cam lobe acting against the stem of said other valve to pull the latter off its seat.

9. A six-cylinder internal combustion engine as in claim 1, wherein said cylinder heads have intake and exhaust valves seated on opposite sides thereof, said valves having their heads directly across from one another;

one of said valves having a hollow tubular stem extending from the bottom side of the valve head, and the other valve having its steam passing through said hollow tubular stem and slidable therein;

cam means disposed in the center of the hexagon defined by said cylinders and rotating about an axis perpendicular to the plane thereof;

first means actuated by said cam means to lift said intake valve off its seat;

second means actuated by said cam means to close said intake valve against its seat;

third means actuated by said cam means to lift said exhaust valve off its seat; and fourth means actuated by said cam means to close said exhaust valve against its seat.

10. A six-cylinder internal combustion engine as in claim 9, wherein said cam means comprises a camshaft having its axis perpendicular to the plane of said hexagon, said camshaft having two pairs of lobes;

the first pair of cam lobes comprising a lifter lobe and a closer lobe for said intake valve;

the second pair of cam lobes comprising a lifter lobe and a closer lobe for said exhaust valve;

said closer lobe of said second pair acting against the bottom end of said exhaust valve stem;

said lifter lobe of said second pair acting against a first pushrod extending generally parallel to said exhaust valve stem, said first pushrod acting against the outer end of a first rocker which is pivoted intermediate its ends, the inner end of said first rocker acting downwardly against a first shoulder means on said exhaust valve to pull said exhaust valve down off its seat;

said lifter lobe of said first pair acting against a second pushrod extending generally parallel to said intake valve stem, said second pushrod acting against a second rocker which, in turn, acts upwardly against a second shoulder means on said intake valve to lift the latter off its seat; and said closer lobe of said first pair acting against a third pushrod extending generally parallel to said intake valve stem, said third pushrod acting against one end of a third rocker which is pivoted intermediate its ends, the other end of said third rocker acting downwardly against a third shoulder means on said intake valve to close the latter against its seat.

11. A six-cylinder internal combustion engine, as in claim 1, wherein said cylinder heads have intake valves provided therein, each of said valves having a stem extending radially inward toward the center of said hexagon; cam means for actuating said intake valves;

a rocker pivoted intermediate its ends adjacent the end of each of said valve stems;

a first pushrod actuated by said cam means and engaging said rocker on one side of its pivot;

a second pushrod actuated by said cam means and engaging said rocker on the other side of said pivot; and means connecting one end of said rocker to said valve stem, whereby oscillation of said rocker by said first and second pushrods causes said intake valve to be lifted from its seat and then closed against its seat responsive to the action of said cam means.

12. A six-cylinder internal combustion engine, as in claim 11, wherein said cam means comprises a pair of axially spaced cam lobes;

a first cam-follower interposed between said first pushrod and one of said cam lobes;

a second cam-follower interposed between said second pushrod and the other of said cam lobes;

each of said cam-followers riding on its respective cam lobe and being lifted thereby; and each of said cam-followers having means for accommodating a limited amount of expansion or contraction in the distance between the associated pushrod and its respective lobe.

13. A six-cylinder internal combustion engine as in claim 1, wherein each of said cylinder heads has at least one valve, the stem of which extends radially inward toward the center of the hexagon defined by said cylinders;

cam means disposed at the center of said hexagon and rotating about an axis perpendicular to the plane thereof;

and means actuated by said cam means for operating said valve.

14. A six-cylinder internal combustion engine as in claim 1, wherein each of said cylinder heads has at least one valve, the stem of which extends radially inward toward the center of the hexagon defined by said cylinders;

cam means disposed at the center of said hexagon and rotating about an axis perpendicular to the plane thereof;

first means actuated by said cam means for lifting said valve off its seat; and second means actuated by said cam means for closing said valve against its seat.

References Cited

UNITED STATES PATENTS

| | | | |
|---|---|---|---|
| 982,468 | 1/1911 | Breton | 123—53 |
| 1,624,489 | 4/1927 | Junge | 123—53 |
| 2,911,964 | 11/1959 | Prescott et al. | 123—41.65 |
| 2,378,726 | 6/1945 | Peters | 123—90 |
| 2,751,895 | 6/1956 | Gassmann | 123—90 |
| 2,857,896 | 10/1958 | Schnepel | 123—90 |

WENDELL E. BURNS, *Primary Examiner.*